Aug. 25, 1953  C. H. ANDERSON, SR  2,649,780
ANGLE MEASURING TOOL
Filed Jan. 26, 1951
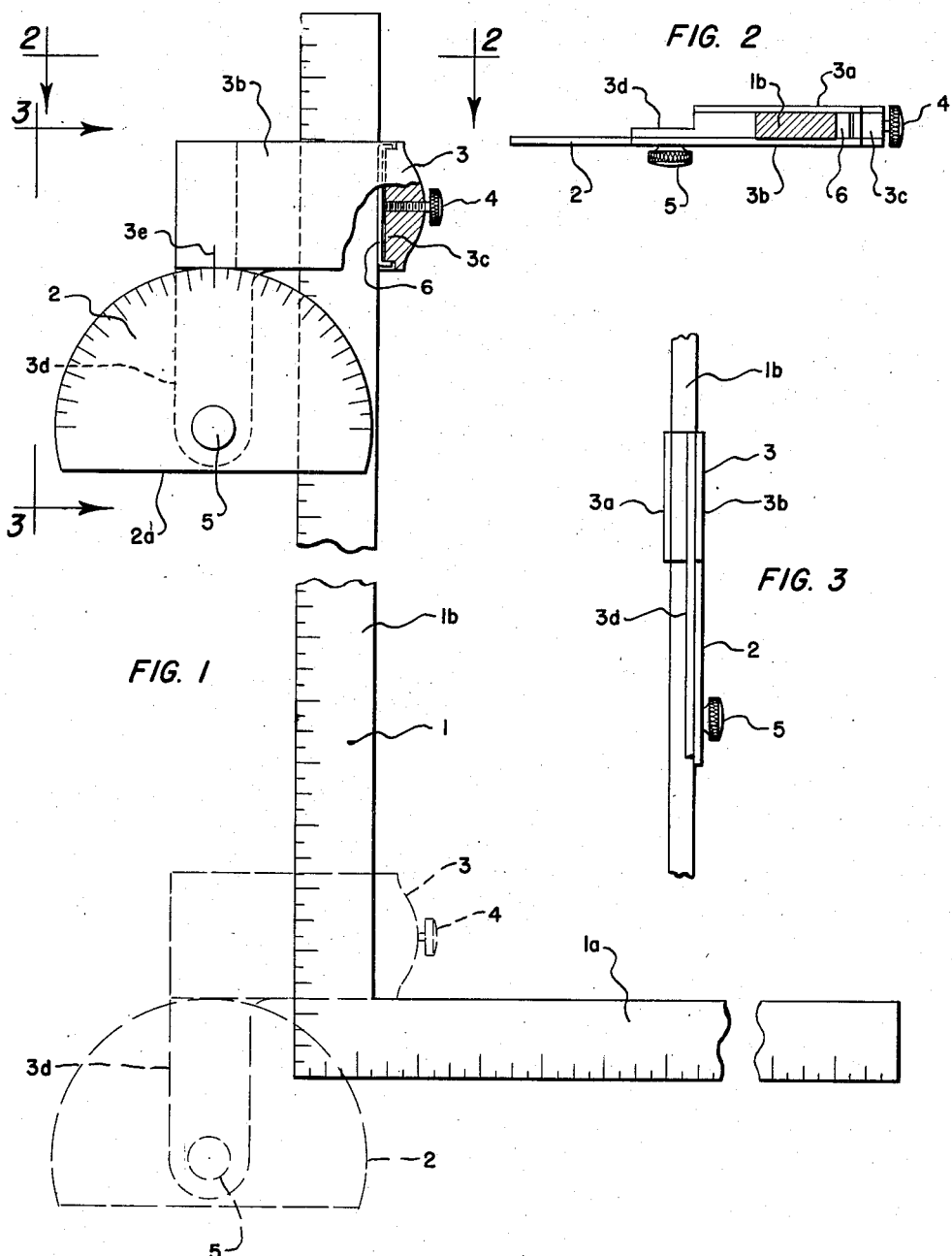
INVENTOR.
CLAIR H. ANDERSON, SR.
BY
Wm. H. Dean
AGENT Patented Aug. 25, 1953

2,649,780

UNITED STATES PATENT OFFICE 2,649,780

ANGLE MEASURING TOOL

Clair H. Anderson, Sr., San Diego, Calif.

Application January 26, 1951, Serial No. 207,960

5 Claims. (Cl. 33—94)

My invention relates to an angle measuring tool, and the objects of my invention are:

First, to provide a tool of this class which provides a very simple means of checking various angular relationships of various objects;

Second, to provide an angle measuring tool of this class which incorporates means for measuring angular planes of various objects spaced from each other;

Third, to provide an angle measuring tool of this class which may be used to measure angular portions of various objects from a surface plate;

Fourth, to provide an angle measuring tool of this class having clamp means slidable on an angular square, adapted to support a protractor beyond the corner of said angular square, whereby both arms of the square may be used in measuring or laying out various angles, as desired;

Fifth, to provide an angle measuring tool of this class wherein a conventional square is provided with a pair of arms extending at right angles to each other, which are of equal width and thickness, permitting the protractor clamp of said angle measuring tool to be transferred from one arm to the other arm of said square without compromising the tolerance fit of the clamp on the square;

Sixth, to provide an angle measuring tool of this class which is very simple to use and which incorporates conventional direct reading of the protractor thereof, and which promotes conventional use of the protractor in connection therewith; and Seventh, to provide an angle measuring tool of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of my angle measuring tool, showing portions thereof broken away to facilitate the illustration, and illustrating by dash lines a varying position of the clamp and protractor of said tool; Fig. 2 is a plan sectional view, taken from the line 2—2 of Fig. 1; and Fig. 3 is an edge elevational view, taken from the line 3—3 of Fig. 1.

Similar characters of reference refer to similar parts and portions throughout the several views of the drawings.

The square 1, protractor 2, clamp 3, screws 4 and 5, and clamp shoe 6, constitute the principal parts and portions of my angle measuring tool.

In the construction of my angle measuring tool, I have provided a square 1, having long and short arms 1a and 1b, respectively, which are both of equal width and thickness, which promotes the tolerance fitting thereof by the clamp 3, which is provided with a conventional shoe 6, engaged by the conventional set screw 4. The clamp 3 is an L-shaped clamp, having a screw 5 pivotally securing the protractor 2 on the clamp 3, all as shown best in Fig. 1 of the drawings.

It will be noted that the L-shaped clamp 3 is provided with a pair of side plates 3a and 3b, which engage opposite sides of the arm 1b, as shown in Fig. 1 of the drawings, and secured to these side plates 3a and 3b is the block 3c, in which the screw 4 is screw-threadably adjustable, and inwardly of this block 3c is the shoe 6, hereinbefore described. The L-shaped construction of the clamp 3 is provided with the downwardly extending arm portion 3d, as shown in Fig. 1 of the drawings, which provides a support for the protractor 2 in flush relationship with the plate 3b, and contiguous to the side of the arm 1b of the square 1.

The protractor 2 is substantially greater than 180° in arcuate extension, and is substantially greater than 180° in proportion to the width of the arm portion 3d, hereinbefore described. Thus, the extension of the protractor 2 beyond its center at the axis of the screw 5 is equal to slightly more than one-half the width of the arm 3d. It will be noted that the arm 3d is considerably longer than the width of either of the arms 1a or 1b of the square 1, permitting the disposition of the protractor 2 considerably beyond the corner of the square 1, all as shown best by dash lines in Fig. 1 of the drawings.

The operation of my angle measuring tool is substantially as follows:

The clamp 3 may be placed on either of the arms 1a or 1b of the square 1, and slidably adjusted longitudinally thereof until disposed in the desired position. It will be noted that the L-shaped construction of the clamp 3, having the arm 3d, permits the clamp 3 to be extended beyond the corner of the square 1, so that the axis of the protractor 2 may be positioned outwardly of the corner of the square 1, as shown by dash lines in Fig. 1 of the drawings. In this position, the protractor may be placed on a surface plate and various angular surfaces may be measured thereby.

When the protractor 2 is located as shown in Fig. 1 of the drawings, the straight edge portion 2a of the protractor 2 may be engaged with the work or an object, as desired, while the extension of the arms 1a and 1b at right angles to each other may be angularly disposed by pivoting the same about the axis of the screw 5 on the protractor 2.

The clamp 3 may be fixed on the square 1 by means of the screw 4, while the screw 5 fixes the angular relationship of the protractor relative to the side plate 3b of the clamp 3, on which the zero designation 3e is located.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. An angle measuring tool consisting of a one piece square, an L-shaped clamp consisting of members shiftable longitudinally on an arm of said square, a protractor pivotally mounted on one member of said L-shaped clamp at its end and arranged to be shifted so that it may be axially pivoted outwardly of the corner forming the apex of said square.

2. An angle measuring tool consisting of a one piece square, an L-shaped clamp consisting of members shiftable longitudinally on an arm of said square, a protractor pivotally mounted on one member of said L-shaped clamp at its end and arranged to be shifted so that it may be axially pivoted outwardly of the corner forming the apex of said square, said protractor having a straight edge portion forming one side thereof adapted to engage a reference surface.

3. An angle measuring tool consisting of a one piece square, an L-shaped clamp consisting of members shiftable longitudinally on an arm of said square, a protractor pivotally mounted on one member of said L-shaped clamp at its end and arranged to be shifted so that it may be axially pivoted outwardly of the corner forming the apex of said square, said protractor having a straight edge portion forming one side thereof adapted to engage a reference surface, both arms of said square being indexed to its corner.

4. An angle measuring tool consisting of a one piece square, an L-shaped clamp consisting of members shiftable longitudinally on an arm of said square, a protractor pivotally mounted on one member of said L-shaped clamp at its end and arranged to be shifted so that it may be axially pivoted outwardly of the corner forming the apex of said square, said protractor having a straight edge portion forming one side thereof adapted to engage a reference surface, both arms of said square being indexed to its corner and means for fixing said clamp in certain position on said square and means for fixing said protractor in certain position on said clamp.

5. An angle measuring tool consisting of a one piece square, an L-shaped clamp consisting of members shiftable longitudinally on an arm of said square, a protractor pivotally mounted on one member of said L-shaped clamp at its end and arranged to be shifted so that it may be axially pivoted outwardly of the corner forming the apex of said square, said protractor having a straight edge portion forming one side thereof adapted to engage a reference surface, both arms of said square being indexed to its corner and means for fixing said clamp in certain position on said square and means for fixing said protractor in certain position on said clamp, the extended portion of said clamp positioned and arranged to hold said protractor in contiguous relationship to the flat side of one member of said square.

CLAIR H. ANDERSON, Sr.

References Cited in the file of this patent

UNITED STATES PATENTS

| Number | Name | Date |
|--------|------|------|
| 163,910 | Batchelder | June 1, 1875 |
| 2,504,244 | Barclay | Apr. 18, 1950 |
| 2,517,264 | Wake | Aug. 1, 1950 |

FOREIGN PATENTS

| Number | Country | Date |
|--------|---------|------|
| 9,561 | Great Britain | May 16, 1894 |